(12) United States Patent  (10) Patent No.: US 8,259,261 B2
Kim  (45) Date of Patent: Sep. 4, 2012

(54) LIQUID CRYSTAL DISPLAY DEVICE COMPRISING A TEMPERED GLASS PLATE WITH AN ANTI-REFLECTION LAYER PREVENTING STATIC ELECTRICITY

(75) Inventor: Sejune Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 280 days.

(21) Appl. No.: 12/419,650

(22) Filed: Apr. 7, 2009

(65) Prior Publication Data

US 2010/0157224 A1  Jun. 24, 2010

(30) Foreign Application Priority Data

Dec. 19, 2008 (KR) .................... 10-2008-0130511

(51) Int. Cl.
*H01L 21/60* (2006.01)
*G02F 1/1335* (2006.01)
*G02F 1/1343* (2006.01)

(52) U.S. Cl. ..................... 349/96; 349/141; 438/118

(58) Field of Classification Search .............. 349/21, 349/58, 96, 122, 137, 141
See application file for complete search history.

(56) References Cited

U.S. PATENT DOCUMENTS

| 4,715,686 | A * | 12/1987 | Iwashita et al. | 349/137 |
| 5,286,608 | A * | 2/1994 | Koh | 430/313 |
| 5,362,552 | A * | 11/1994 | Austin | 428/216 |
| 5,973,450 | A * | 10/1999 | Nishizawa et al. | 313/478 |
| 7,162,141 | B1 * | 1/2007 | Takano | 385/147 |
| 7,304,428 | B2 * | 12/2007 | Ghosh et al. | 313/506 |
| 7,833,835 | B2 * | 11/2010 | Aoyagi et al. | 438/118 |
| 2001/0043302 | A1 * | 11/2001 | Inoue et al. | 349/137 |
| 2002/0041343 | A1 * | 4/2002 | Ikui et al. | 348/819 |
| 2005/0219438 | A1 * | 10/2005 | Park | 349/58 |
| 2006/0139501 | A1 * | 6/2006 | Lee et al. | 349/21 |
| 2009/0086126 | A1 * | 4/2009 | Ohgaru et al. | 349/96 |
| 2010/0014034 | A1 * | 1/2010 | Matsuhira | 349/122 |

* cited by examiner

*Primary Examiner* — Akm Ullah
(74) *Attorney, Agent, or Firm* — Morgan, Lewis & Bockius LLP

(57) ABSTRACT

A liquid crystal display device is provided. The liquid crystal display device according to an exemplary embodiment includes a backlight unit; a liquid crystal display panel located on the backlight unit; a polarization plate located on the liquid crystal display panel; and a tempered glass plate located on the polarization plate, the tempered glass plate including an anti-reflection layer having at least one of a non-conductive oxide film and a conductive oxide film, wherein a conductive tape is connected to a portion of the anti-reflection layer.

6 Claims, 8 Drawing Sheets

LIQUID CRYSTAL DISPLAY DEVICE COMPRISING A TEMPERED GLASS PLATE WITH AN ANTI-REFLECTION LAYER PREVENTING STATIC ELECTRICITY

This application claims the benefit of Korean Patent Application No. 10-2008-0130511 filed on December 19, which is hereby incorporated by reference.

BACKGROUND

1. Field

This document relates to a liquid crystal display (LCD) device, and more specifically to a liquid crystal display (LCD) device that includes a tempered glass plate with an anti-reflection film that may prevent static electricity.

2. Description of the Related Art

Recently, various studies replacing existing fossil fuels have been undertaken in order to solve upcoming energy problems. In particular, a diversity of research focuses on utilization of natural energy sources such as wind power, nuclear power, solar power, etc. to replace petroleum resources expected to be exhausted within a few tens of years.

As various portable devices, such as cell phones, PDAs, and laptop computers, are developed in recent years, thin and light-weight flat panel display devices which may be applied to these portable devices are increasingly becoming demanded. These flat panel display devices include liquid crystal displays (LCD devices), plasma display panels (PDPs), and organic light emitting diodes (OLEDs), all being intensively studied, and especially LCD devices gain popularity thanks to mass production technologies, easy-to-handle driving means, and easiness to implement high quality.

The LCD device provides various display modes based on the arrangement of liquid crystal molecules, however, TN mode LCD devices are generally used because of many advantages such as easiness to display black and white, rapid response speed, and low driving voltages. In a TN mode LCD device, liquid crystal molecules arranged parallel to a substrate are aligned substantially perpendicular to the substrate when a voltage is applied to the LCD device. Accordingly, there occurs a problem of decreasing view angles upon application of the voltage due to anisotropy in refractive index of the liquid crystal molecules.

There have been recently suggested LCD devices having various modes, which features wide view angles to address these problems with view angles. Among them, IPS (In Plane Switching) mode LCD devices are currently under mass production. An IPS mode LCD device has at least a pair of electrodes that are arranged parallel to each other in a pixel and generates horizontal electric fields that are substantially parallel with a substrate, which allows liquid crystal molecules to be aligned on the plane.

However, the above-mentioned IPS mode LCD device causes static electricity on the surface of the glass substrate, and the static electricity generates electric fields in the direction perpendicular to the LCD panel. Accordingly, the horizontal electric fields on the liquid crystal layer are distorted by the vertical electric fields and the horizontal electric fields applied to the liquid crystal layer are not completely in parallel with the LCD panel. If the horizontal electric fields are not in parallel with the LCD panel, the liquid crystal molecules on the liquid crystal layer are not rotated on the same plane, thus causing the deterioration of the LCD device.

In the above-mentioned LCD devices of various modes, light incident from the outside or emitted from the inside is reflected on the surface of the LCD device, and this lowers the LCD device quality and causes the LCD device to be easily damaged due to external impacts, thereby lowering the reliability.

SUMMARY

An aspect of this document provides an LCD device that includes a tempered glass plate having an anti-reflection film that may improve the reliability and prevent static electricity.

In an aspect, a liquid crystal display (LCD) device may include a backlight unit; an LCD panel located on the backlight unit; a polarization plate located on the LCD panel; and a tempered glass plate located on the polarization plate, the tempered glass plate including an anti-reflection layer having at least one of a non-conductive oxide film and a conductive oxide film, wherein a conductive tape is connected to a portion of the anti-reflection layer.

BRIEF DESCRIPTION OF THE DRAWINGS

The accompany drawings, which are included to provide a further understanding of the document and are incorporated on and constitute a part of this specification illustrate embodiments of the document and together with the description serve to explain the principles of the document.

DETAILED DESCRIPTION

Reference will now be made in detail embodiments of which are illustrated in the accompanying drawings.

According to an exemplary embodiment, a liquid crystal display (LCD) device may include a backlight unit; a liquid crystal display panel located on the backlight unit; a polarization plate located on the liquid crystal display panel; and a tempered glass plate located on the polarization plate, the tempered glass plate including an anti-reflection layer having at least one of a non-conductive oxide film and a conductive oxide film, wherein a conductive tape is connected to a portion of the anti-reflection layer.

The anti-reflection layer may be located on the tempered glass plate, and have a non-conductive oxide film, a conductive oxide film, and a non-conductive oxide layer laminated in the order thereof.

The anti-reflection layer may further include a via hole that exposes the conductive oxide film.

The conductive tape may be connected to the conductive oxide film through the via hole.

The via hole may penetrate the anti-reflection layer to expose the tempered glass plate.

The via hole may be filled with a conductive material.

The conductive tape may be connected to the conductive material.

The non-conductive oxide film may be formed of any one selected from the group consisting of NbOxNx, SiOx, TiOx, ZrOx, and TaOx.

The conductive oxide film may be formed of any one selected from the group consisting of ITO, SnOx, ZnOx, and InxOy.

The via hole may be formed using a lift-off method.

Hereinafter, exemplary embodiments will be described with reference to accompanying drawings.

Figure 1:
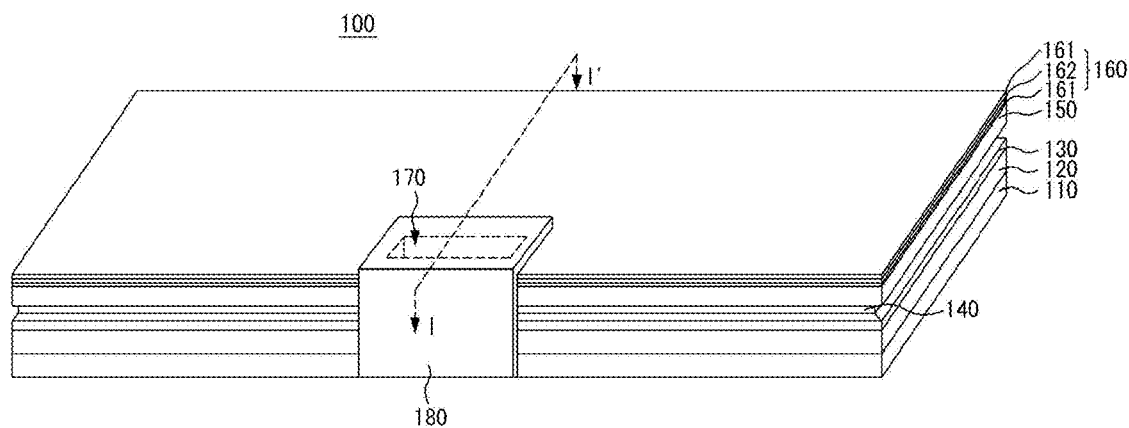
FIG. 1 is a perspective view illustrating a liquid crystal display device according to a first exemplary embodiment.

FIG. 1 is a view illustrating a liquid crystal display device according to a first exemplary embodiment.

Referring to FIG. 1, the liquid crystal display device 100 according to a first exemplary embodiment includes a backlight unit 110, a liquid crystal display panel 120 located on the backlight unit 110, a polarization plate 140 located on the liquid crystal display panel 120, and a tempered glass plate 150 that is located on the polarization plate 140 and has an anti-reflection layer 160. The liquid crystal display device 100 may further include a conductive tape 180 that is connected to a portion of the anti-reflection layer 160.

Figure 2:
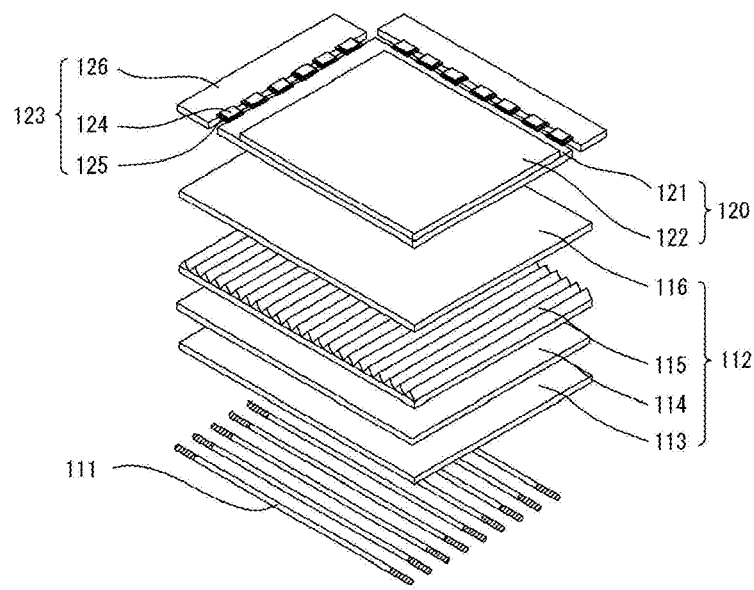
FIG. 2 is a perspective view illustrating a liquid crystal display panel and a backlight unit according to an exemplary embodiment.

FIG. 2 is an exploded perspective view illustrating a backlight unit and a liquid crystal display panel according to an exemplary embodiment.

A backlight unit and a liquid crystal display panel according to an exemplary embodiment will be described with reference to FIG. 2.

The backlight unit 110 may include a light source 111 that emits light. Also, the backlight unit 110 may include an optical film layer 112 that guides the light emitted from the light source 111. The optical sheet 112 may include a diffusion plate 113, a diffusion sheet 114, an optical sheet 115, and a protection sheet 116 that are located on the light source 111.

The light source 111 may be selected from, for example, a cold cathode fluorescent lamp (CCFL), a hot cathode fluorescent lamp (HCFL), an external electrode fluorescent lamp (EEFL), and a light emitting diode (LED), but is not limited thereto.

Also, the light source 111 may be selected from an edge-type light source whose lamp is located outside its portion, a dual-type light source whose lamp is located at both sides, and a direct-type light source which has a plurality of lamps that are arranged parallel with each other, but is not limited thereto. The light source 111 is connected to an inverter (not shown) and may receive electricity from the inverter to emit light.

A direct-type light source is shown in FIG. 2 as an example of the light source 111. Other light sources, for example, edge-type light sources, may also be employed as the light source 111.

The afore-mentioned optical sheet 112 may be formed to have a plurality of prisms as shown in FIG. 2, but is not limited thereto. For example, the optical sheet 112 may be formed to have a plurality of lenticular lens or micro lens. And, the optical sheet 112 may further include beads.

The liquid crystal display panel 120 may have a structure that includes a first substrate 121 and a second substrate 122 that is joined with the first substrate 121, with a liquid crystal layer sandwiched therebetweeen, wherein a thin film transistor (TFT) array is formed on the first substrate 121 and a color filter is formed on the second substrate 122. Sub pixels, independently driven by TFTs, are arranged in a matrix pattern on the liquid crystal display panel 120.

The liquid crystal molecules are aligned according to a differential voltage between a common voltage supplied to a common electrode and a data signal supplied to a pixel electrode connected to a TFT, and the aligned liquid crystal molecules control the light transmittance, thus making it possible to display an image.

Further, a driving unit 123 may be connected to the first substrate 121 of the liquid crystal display panel 120. The driving unit 123 includes a plurality of flexible films 125 and an external circuit substrate 126. On each of the flexible films 125 is mounted a driving chip 124 that has a data driver for driving data lines of the liquid crystal display panel 120 and a scan driver for driving scan lines of the liquid crystal display panel 120. The first substrate 121 is connected to one side of each one of the flexible films 125, and the external circuit substrate 126 may be connected to the other side of each one of the plurality of flexible films 125.

The flexible film 125 having the driving chip 124 mounted thereon may be located in such a manner as a COF (Chip On Film) manner or TCP (Tape Carrier Package) manner. However, one or more of the data driver and scan driver included in the driving chip 124 may be directly mounted on the first substrate 121 in a COG manner or formed onto the first substrate 121 and embedded in the liquid crystal display panel 120 in the process of forming the TFTs.

Returning to FIG. 1, a back-side ITO layer 130 may be located on the liquid crystal display panel 120.

The back-side ITO layer 130 is provided to discharge static charges that may be generated on the surface of the second substrate 122 of the liquid crystal display panel 120, and may be formed of ITO (Indium Tin Oxide). The back-side ITO layer 130 is transparent and thus may have light emitted from the liquid crystal display panel 120 directed upward.

The polarization plate 140 may be located on the back-side ITO layer 130.

The polarization plate 140 is located at the upper portion of the liquid crystal display panel 120 to convert light whose waveform vibrates in an irregular direction and that is emitted from the backlight unit 110 and passes through the liquid crystal layer of the liquid crystal display panel 120 into light whose waveform vibrates only in one direction.

The polarization plate 140 may be formed by causing a reaction between iodine molecules and a PVA film or dying the PVA film with a dichroic dye, and an example of the polarization plate 140 may include a PVA-iodine based polarization plate or a PVA-dye based polarization plate.

The tempered glass plate 150 having the anti-reflection layer 160 may be located on the polarization plate 140.

The tempered glass plate 150 serves to prevent the liquid crystal display panel 120 from being easily damaged by external impacts. The tempered glass plate 150 may be formed by heating a general glass plate at a temperature of 500 to 600□, which is similar to the softening temperature of glass, and then abruptly cooling it with compressed cooling air to apply compressive deformation on the surface of the glass and apply tensile deformation on the inside of the glass. The bending strength and the impact resistance of the tempered glass plate 150 reaches three to five times and three to eight times, respectively, of those of normal glass, as well as an excellent thermal endurance.

The anti-reflection layer 160 may be located on the tempered glass plate 150.

The anti-reflection layer 160 serves to prevent the light incident from the exterior or light emitted from the interior from being reflected on the surface of the liquid crystal display device, and the anti-reflection layer 160 may include a non-conductive oxide film 161 and a conductive oxide film 162 that are deposited one over another.

The non-conductive oxide film 161 may be formed of any one selected from the group consisting of NbOxNx, SiOx, TiOx, ZrOx, and TaOx which are materials with high refractive index, and its thickness may range from 10 nm to 100 nm.

And, the conductive oxide film 162 may be formed of any one selected from the group consisting of ITO, SnOx, ZnOx, and InxOy which are materials with high refractive index, and its thickness may range from 10 nm to 100 nm.

The anti-reflection layer 160 may include multiple non-conductive oxide films 161 and multiple conductive oxide films 162, each having high refractive index, wherein the non-conductive oxide film and the conductive oxide film are alternately laminated. Accordingly, light beams incident onto the anti-reflection layer 160 from the exterior or interior are reflected by the multiple non-conductive oxide films 161 and the multiple conductive oxide films 162 of the anti-reflection layer 160. The reflected light beams interfere with one another, thus causing effective destructive interference, and therefore, the reflecting light beams are overall suppressed so that the light can penetrate the anti-reflection layer 160.

Although it has been described in the exemplary embodiment that the anti-reflection layer 160 has a triple structure consisting of a non-conductive oxide film, a conductive oxide film, and a non-conductive oxide film, this document is not limited to this exemplary embodiment. For example, the anti-reflection layer 160 may include six layers consisting of a non-conductive oxide film, a conductive oxide film, a non-conductive oxide film, a non-conductive oxide film, a conductive oxide film, and a non-conductive oxide film, or nine layers.

And, in case that the tempered glass plate 150 is provided at the upper portion of the liquid crystal display panel 120 for increasing the durability, static electricity may occur on the tempered glass plate 150. The static electricity may have an effect on the components driven in the liquid crystal display panel 120, thus causing mal operation.

Accordingly, the anti-reflection layer 160 includes the conductive oxide film 162 to discharge the static charges generated on the tempered glass plate 150 to the outside.

Figure 3A:
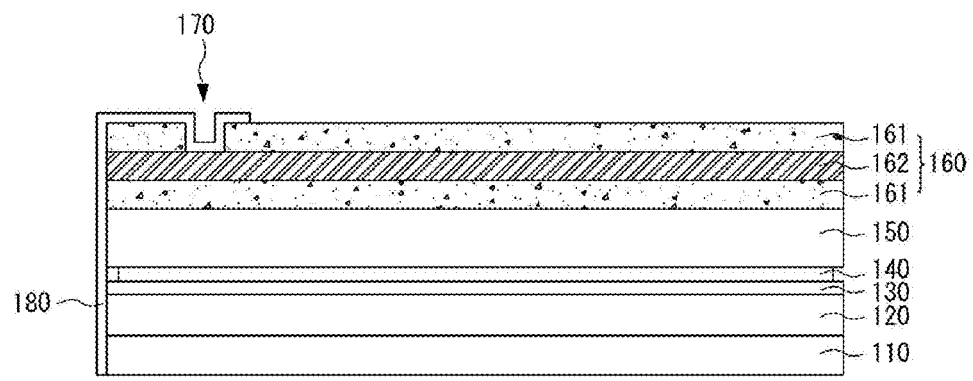
FIGS. 3A and 3B are cross sectional views illustrating the liquid crystal display device according to the first exemplary embodiment, taken along the line I-I' shown in FIG. 1.
Figure 3B:
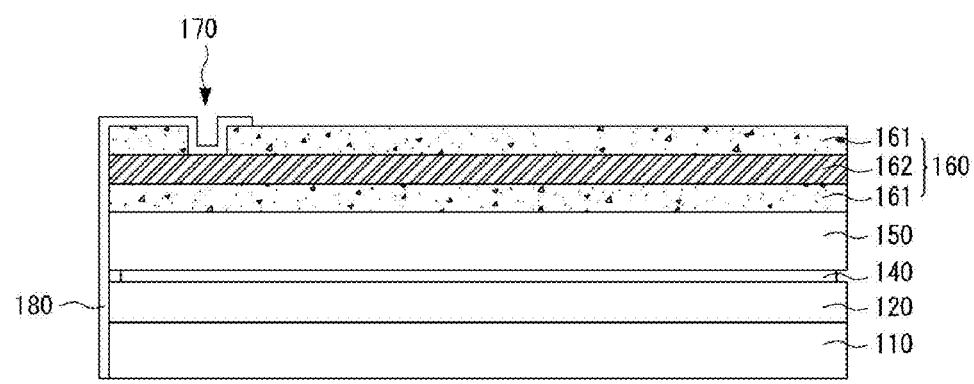

FIGS. 3A and 3B are cross sectional views illustrating the liquid crystal display device according to the first exemplary embodiment, taken along the line I-I' shown in FIG. 1. Hereinafter, the same reference numerals refer to the same components as those shown in FIGS. 1 and 2, and thus repetitive descriptions will be omitted.

Referring to FIG. 3A, the anti-reflection layer 160 may have a via hole 170 to ground the conductive oxide film 162 whose surface is covered by the non-conductive oxide film 161.

The via hole 170 may be formed by partially removing the non-conductive oxide film 161 of the anti-reflection layer 160 to expose the non-conductive oxide film 161.

The exposed conductive oxide film 161 may be connected to a conductive tape 180 that is grounded to the backlight unit 110 through the via hole 170.

The conductive tape 180 is formed of a conductive material, and thus may discharge static charges generated on the surface of the liquid crystal display device to the outside.

A lift-off method may be used to form the via hole 170.

Hereinafter, a method of forming the via hole using the lift-off method will be described with reference to FIGS. 4A and 4B.

Figure 4A:
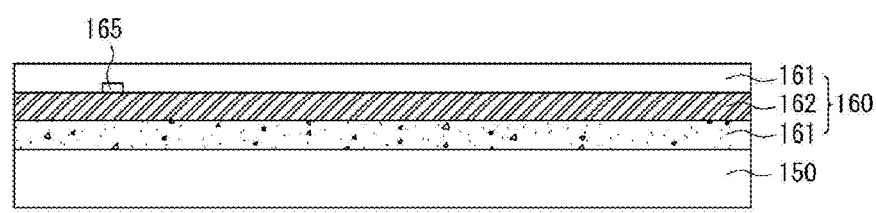
FIGS. 4A and 4B are cross sectional views illustrating a process of producing a via hole of the liquid crystal display device according to the first exemplary embodiment.
Figure 4B:
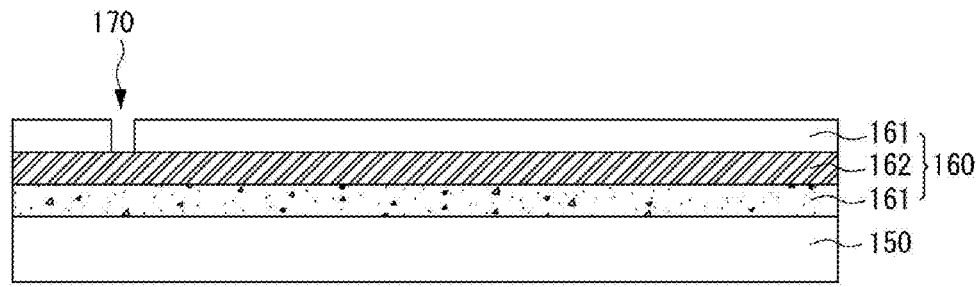

Referring to FIG. 4A, the non-conductive oxide film 161 and the conductive oxide film 162 are formed on the entire top surface of the tempered glass plate 150.

Then, photo resist is applied on the entire top surface of the tempered glass plate 150, and a photo resist pattern 165 is formed on a region where the via hole 170 is formed.

Next, the non-conductive oxide film 161 is deposited on the tempered glass plate 150 on which the photo resist pattern 165 has been formed.

Subsequently, referring to FIG. 4B, the photo resist pattern 165 formed on the tempered glass plate 150 is removed by using the lift-off method. At this time, the non-conductive oxide film 161 formed on the photo resist pattern 165 is removed along with the photo resist pattern 165.

This may yield the via hole 170 that exposes the conductive oxide film 162 of the anti-reflection layer 160.

Unlike in FIG. 3A, meanwhile, the back-side ITO layer formed on the liquid crystal display panel 120 may be omitted from the liquid crystal display device since the anti-reflection layer 160 serves to prevent static electricity as shown in FIG. 3B.

Figure 5A:
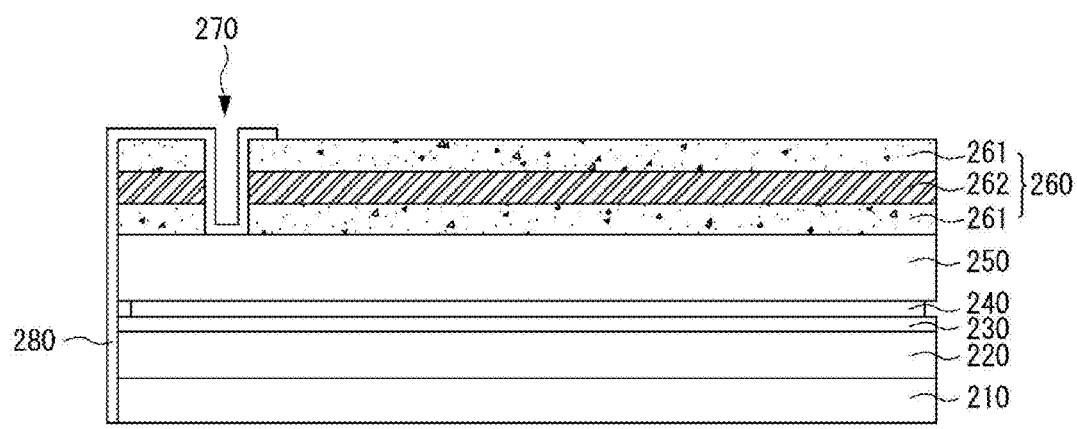
FIGS. 5A and 5B are cross sectional views illustrating a liquid crystal display device according to a second exemplary embodiment.
Figure 5B:
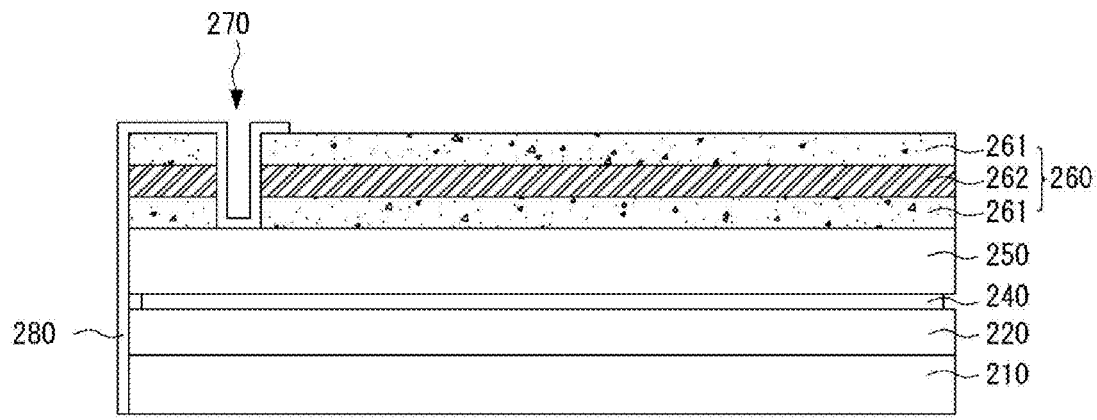

FIGS. 5A and 5B are views illustrating a liquid crystal display device according to a second exemplary embodiment. Hereinafter, the same components as those in the above exemplary embodiment will not be repetitively described.

Referring to FIG. 5A, a via hole 270 may be formed to penetrate the entirety of an anti-reflection layer 260 unlike in the first exemplary embodiment.

That is, a photo resist pattern is formed on a tempered glass plate 250, a non-conductive oxide film 261, a conductive oxide film 262, and a non-conductive oxide film 261 are laminated in a sequential manner, and the photo resist pattern is removed using the above-described lift-off method. This may yield the via hole 270 penetrating the anti-reflection layer 260 as shown in FIG. 5A.

In this exemplary embodiment, the via hole 270 is formed to penetrate the anti-reflection layer 260 unlike in the above-described exemplary embodiment, and this increases the contacting area between the conductive oxide film 262 and a conductive tape 280, thereby allowing the static charges to be more effectively discharged.

Unlike in FIG. 5A, meanwhile, the back-side ITO layer formed on the liquid crystal display panel 220 may be omitted from the liquid crystal display device since the anti-reflection layer 260 serves to prevent static electricity as shown in FIG. 5B.

Figure 6A:
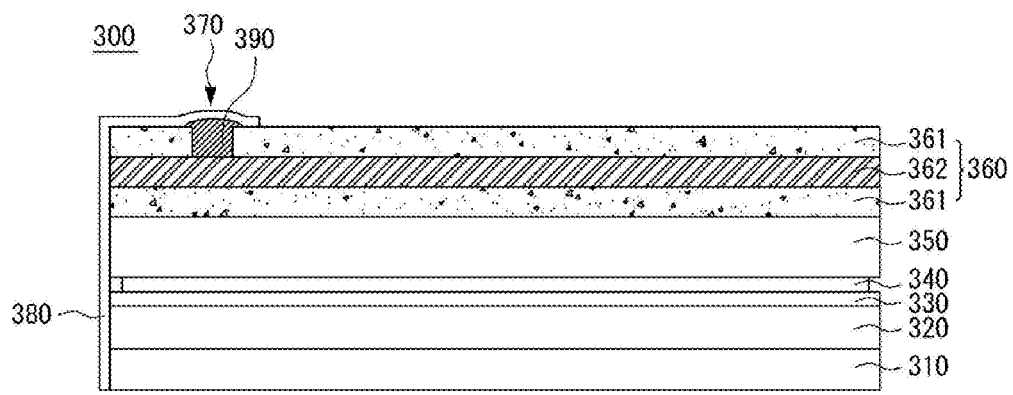
FIGS. 6A and 6B are cross sectional views illustrating a liquid crystal display device according to a third exemplary embodiment.
Figure 6B:
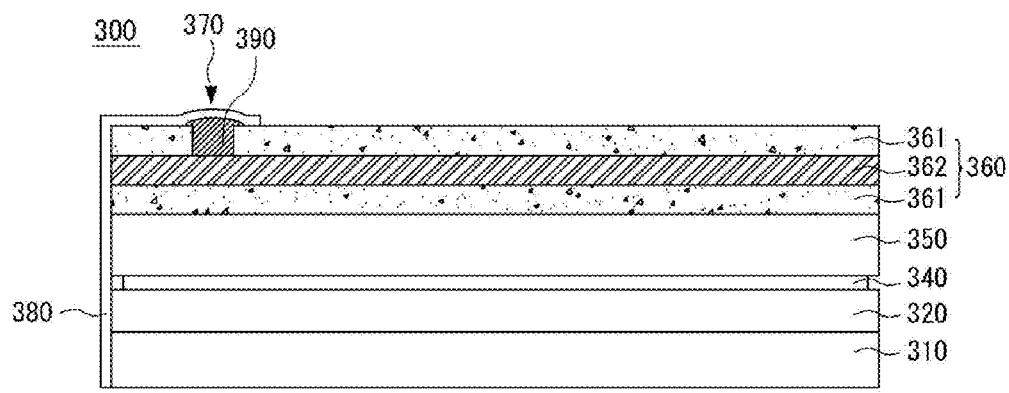

FIGS. 6A and 6B are views illustrating a liquid crystal display device according to a third exemplary embodiment.

The liquid crystal display device 300 according to the third exemplary embodiment may include a backlight unit 310, a liquid crystal display panel 320 located on the backlight unit 310, a back-side ITO layer 330 located on the liquid crystal display panel 320, a polarization plate 340 located on the back-side ITO layer 330, a tempered glass plate 350 located on the polarization plate 340, and an anti-reflection layer 360 located on the tempered glass plate 350.

Hereinafter, the same components as those described in the above exemplary embodiments will not be repetitive described.

Referring to FIG. 6A, the anti-reflection layer 360, which includes a non-conductive oxide film 361, a conductive oxide film 362, and a non-conductive oxide film 361, may be located on the tempered glass plate 350.

A portion of the non-conductive oxide film 361 of the anti-reflection layer 360 may be removed by using a lift-off method to produce a via hole 370 that exposes the conductive oxide film 362. And, the via hole 370 may be filled with a conductive material 390.

The conductive material 390 may play a role as a medium which connects a conductive tape 380 with the conductive oxide film 362. That is, the via hole 370 may be filled with the conductive material 390 so that the conductive oxide film 362 may be indirectly connected to the conductive tape 380.

This allows for a reliable connection between the conductive tape 380 and the conductive oxide film 362. In case that the conductive material 390 is protruded outside the surface of the non-conductive oxide film 361, the conductive tape 380 may be very easily attached to the conductive oxide film 362.

In this case, the conductive material 390 may be any materials having conductivity. For example, the via hole 370 may be filled with silver (Ag) paste.

Unlike in FIG. 6A, the back-side ITO layer 330 formed on the liquid crystal display panel 320 in FIG. 6A may be omitted from the liquid crystal display device 300 shown in FIG. 6B wherein the anti-reflection layer 360 serves to prevent static electricity.

Figure 7A:
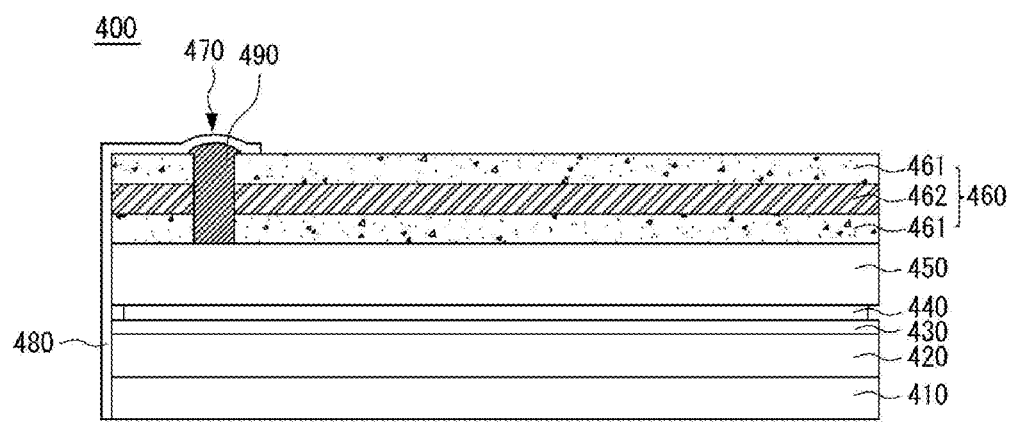
FIGS. 7A and 7B are cross sectional views illustrating a liquid crystal display device according to a fourth exemplary embodiment.
Figure 7B:
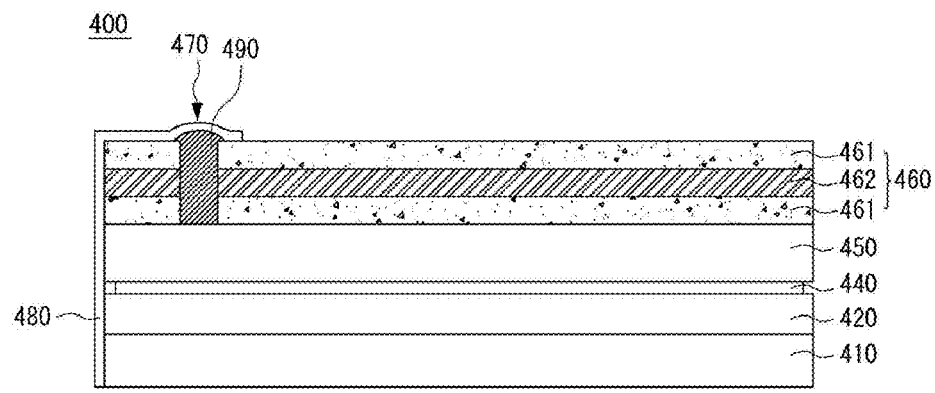

FIGS. 7A and 7B are views illustrating a liquid crystal display device according to a fourth exemplary embodiment.

Referring to FIG. 7A, the liquid crystal display device 400 according to the fourth exemplary embodiment may include a backlight unit 410, a liquid crystal display panel 420 located on the backlight unit 410, a back-side ITO layer 430 located on the liquid crystal display panel 420, a polarization plate 440 located on the back-side ITO layer 430, a tempered glass plate 450 located on the polarization plate 440, and an anti-reflection layer 460 located on the tempered glass plate 450.

Unlike in the above-described third exemplary embodiment, the liquid crystal display device 400 according to the four exemplary embodiment has a structure different from that of the third exemplary embodiment in that a via hole 470 penetrates the anti-reflection layer 460 and is filled with a conductive material 490 to connect to a conductive tape 480.

Unlike in FIG. 7A, the back-side ITO layer formed on the liquid crystal display panel 420 shown in FIG. 7A may be omitted from the liquid crystal display device 400 shown in FIG. 7B wherein the anti-reflection layer 460 serves to prevent static electricity.

Figure 8:
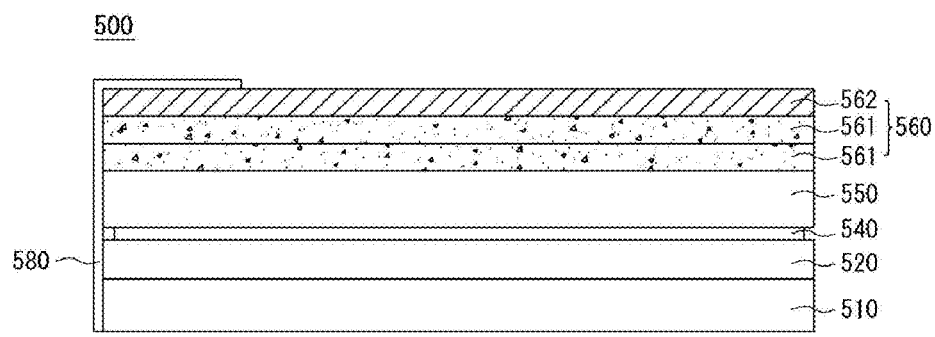
FIG. 8 is a cross sectional views illustrating a liquid crystal display device according to a fifth exemplary embodiment.

FIG. 8 is a view illustrating a liquid crystal display device according to a fifth exemplary embodiment.

The liquid crystal display device 500 according to the fifth exemplary embodiment may include a backlight unit 510, a liquid crystal display panel 520 located on the backlight unit 510, a polarization plate 540 located on the liquid crystal display panel 520, a tempered glass plate 550 located on the polarization plate 540, and an anti-reflection layer 560 located on the tempered glass plate 550.

Unlike in the first to fourth exemplary embodiments, the anti-reflection layer 560 may have a structure where a non-conductive oxide film 561, a non-conductive oxide film 561, and a conductive oxide film 562 are laminated in a sequential manner.

The anti-reflection layer 560 may include more than three non-conductive oxide films and conductive oxide films that are deposited one over another. At this time, the conductive oxide film 562 may be located at the top of the anti-reflection layer 560 to facilitate to connect to the conductive tape 580.

Hereinafter, exemplary embodiments will be described in aid of understanding the present document. However, it should be noted that the following exemplary embodiments are only an example, and the present document is not limited to these exemplary embodiments.

Exemplary Embodiment

A liquid crystal display panel having a back-side ITO layer and a polarization plate was assembled on a direct-type backlight unit. And, an anti-reflection layer having a non-conductive oxide film, a conductive oxide film, and a non-conductive oxide film, each deposited on another and having the thickness of 100 nm, was formed on the tempered glass plate. Then, a via hole was bored in the anti-reflection layer and filled with silver (Ag) paste. The anti-reflection layer was then attached on the liquid crystal display panel. Next, a conductive tape was connected to the silver paste filled in the via hole thereby to complete the liquid crystal display device according to the fourth exemplary embodiment shown in FIG. 7A.

Comparative Example

A liquid crystal display panel having a back-side ITO layer and a polarization plate was assembled on a direct-type backlight unit. And, an anti-reflection layer including the non-conductive oxide film, the conductive oxide film, and the non-conductive oxide film, each deposited on another and having the thickness of 100 nm, was formed on the tempered glass plate. The anti-reflection layer was then attached to the liquid crystal display panel thereby to produce a liquid crystal display device without any means to prevent static electricity.

Discharge experiments have been executed on the liquid crystal display device manufactured according to the exemplary embodiment and comparative example. The screen of the liquid crystal display device was observed before discharge, 10 times after discharge, and 20 times after discharge, and the results were then represented in FIGS. 9A to 9F.

In these discharge experiments, a discharging gun which has the discharge capacity of 330 Ω/150 pF was used to discharge any point near the center of the liquid crystal display device.

Figure 9A:
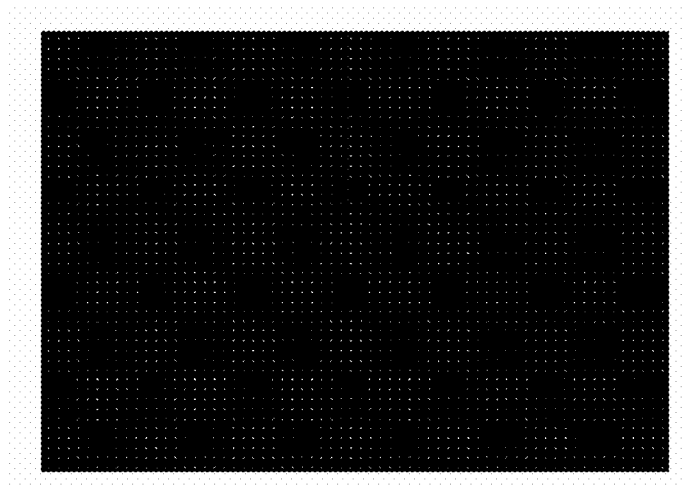
FIGS. 9A, 9B, 9C, 9D, 9E, and 9F are views illustrating results of a discharge experiment using a liquid crystal display device according to an exemplary embodiment.
Figure 9B:
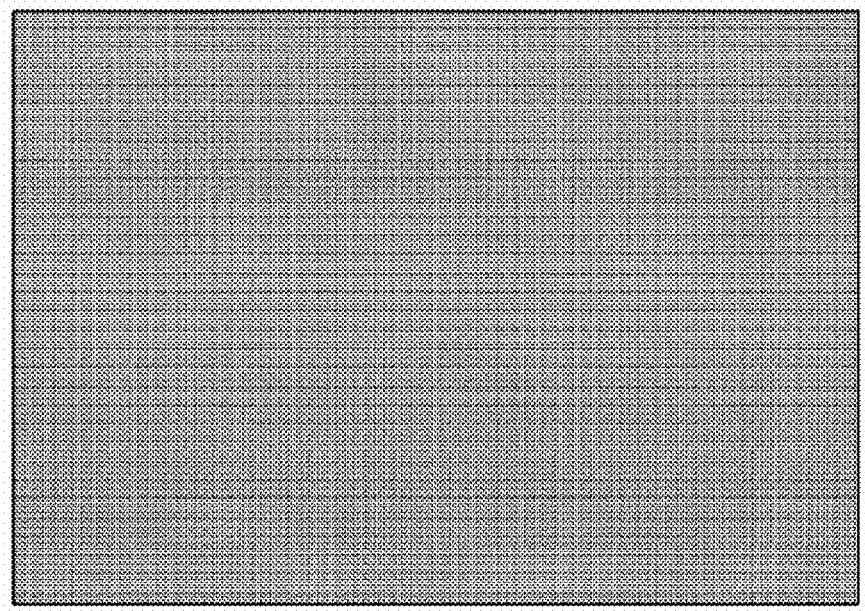
Figure 9C:
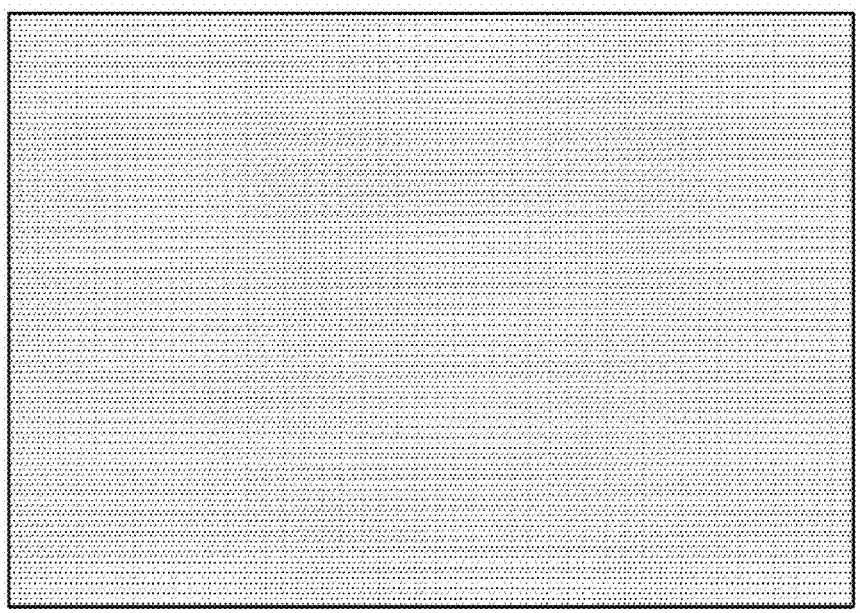

Referring to FIGS. 9A, 9B, and 9C, which depict results of the discharge experiment using the liquid crystal display device manufactured according to the comparative example, firstly, it can be seen that the screen was blue before discharge, became faint 10 times after discharge, and completely became white, so called "whitening" occurred, 20 times after discharge.

Figure 9D:
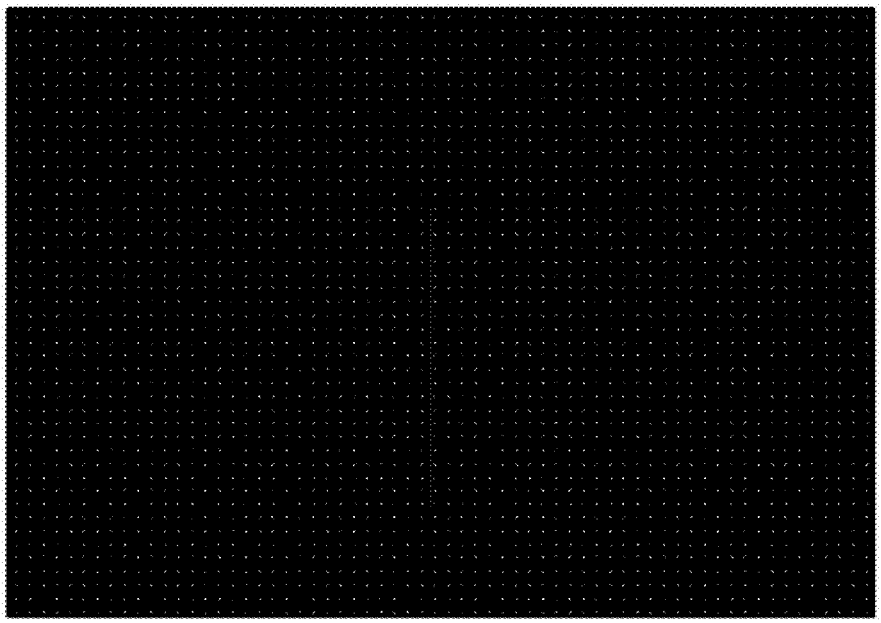
Figure 9E:
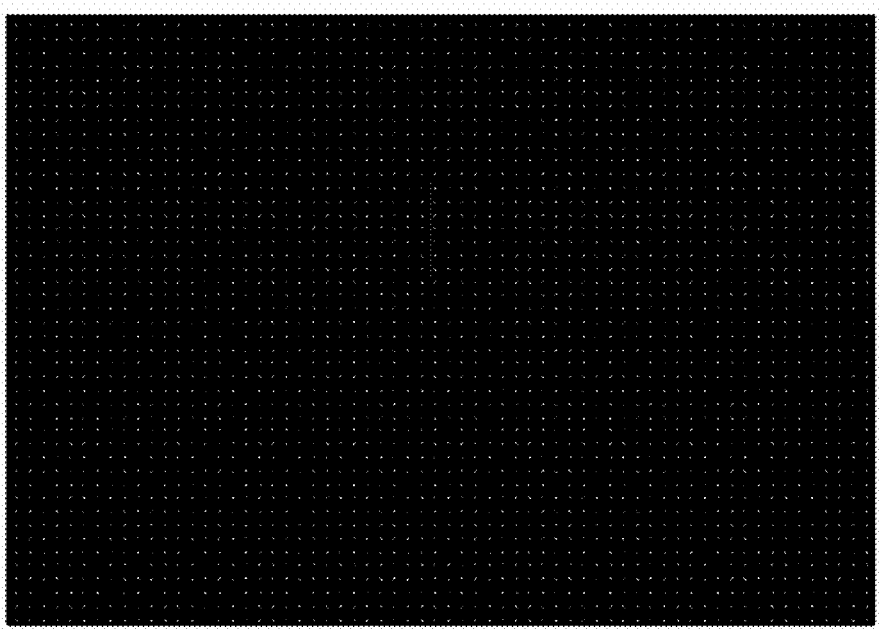
Figure 9F:
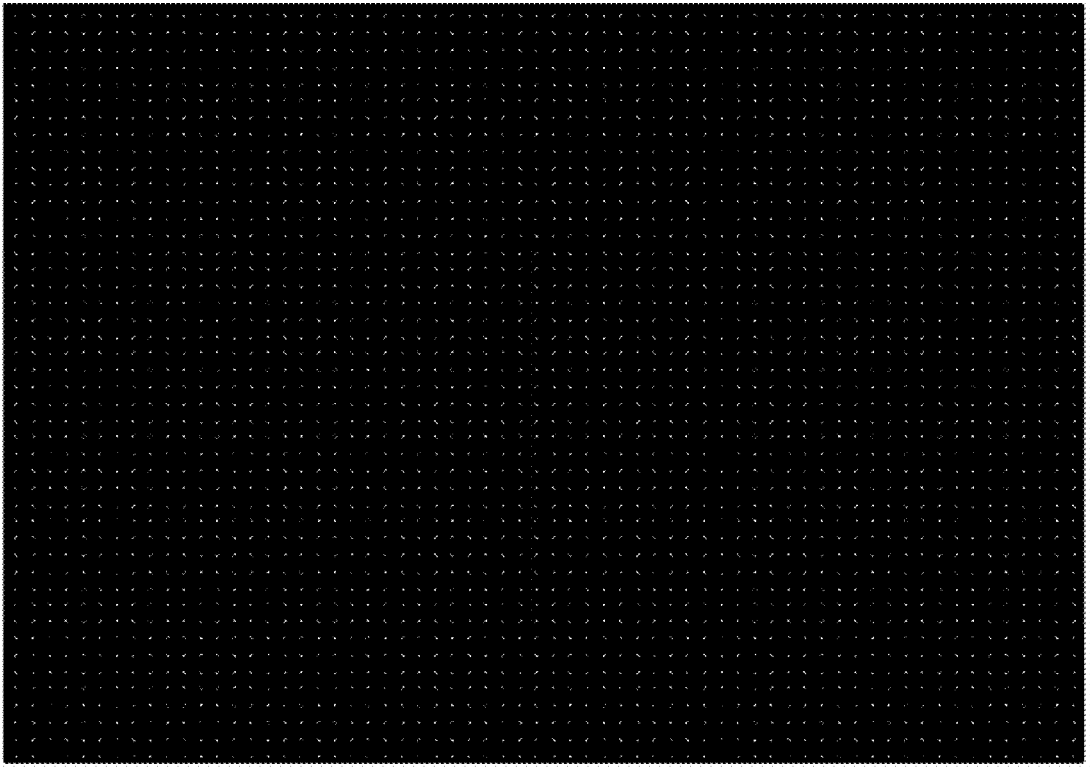

Referring to FIGS. 9D, 9E, and 9F, which depict results of the discharge experiment using the liquid crystal display device manufactured according to an exemplary embodiment, however, it can be seen that whitening does not occur before discharge, 10 times after discharge, and even 20 times after discharge.

As described above, the liquid crystal display device according to the exemplary embodiments includes the tempered glass plate having the anti-reflection film that may prevent static electricity, and thus may improve its display quality and durability as well as suppress the occurrence of static electricity to prevent mat operation of the liquid crystal display device.

The foregoing embodiments and advantages are merely exemplary and are not to be construed as limiting the present document. The present teaching can be readily applied to other types of apparatuses. The description of the foregoing embodiments is intended to be illustrative, and not to limit the scope of the claims. Many alternatives, modifications, and variations will be apparent to those skilled in the art.

In the claims, means-plus-function clauses are intended to cover the structures described herein as performing the recited function and not only structural equivalents but also equivalent structures. Moreover, unless the term "means" is explicitly recited in a limitation of the claims, such limitation is not intended to be interpreted under 35 USC 112(6).

What is claimed is:

1. A liquid crystal display device comprising:
a backlight unit;
a liquid crystal display panel located on the backlight unit;
a polarization plate located on the liquid crystal display panel;
a tempered glass plate located on the polarization plate, the tempered glass plate including an anti-reflection layer having a non-conductive oxide film and a conductive oxide film, and
a conductive tape contacting a portion of the anti-reflection layer and discharged static charge,
wherein the anti-reflection layer further includes a via hole that exposes the conductive oxide film,
wherein the conductive tape is in contact with the conductive oxide film through the via hole,
wherein the via hole is filled with a conductive material and,
wherein the conductive tape is in contact with the conductive material.

2. The liquid crystal display device of claim 1, wherein the anti-reflection layer is located on the tempered glass plate, and has a non-conductive oxide film, a conductive oxide film, and a non-conductive oxide layer laminated in the order thereof.

3. The liquid crystal display device of claim 1, wherein the via hole penetrates the anti-reflection layer to expose the tempered glass plate.

4. The liquid crystal display device of claim 1, wherein the non-conductive oxide film is formed of any one selected from the group consisting of NbOxNx, SiOx, TiOx, ZrOx, and TaOx.

5. The liquid crystal display device of claim 1, wherein the conductive oxide film is formed of any one selected from the group consisting of ITO, SnOx, ZnOx, and InxOy.

6. The liquid crystal display device of claim 1, wherein the via hole is formed using a lift-off method.

* * * * *